United States Patent [19]
Nitta

[11] Patent Number: 6,108,519
[45] Date of Patent: Aug. 22, 2000

[54] MOBILE COMMUNICATIONS SYSTEM

[75] Inventor: Yoshio Nitta, Tokyo, Japan

[73] Assignee: NEC Corporation, Tokyo, Japan

[21] Appl. No.: 09/065,422

[22] Filed: Apr. 24, 1998

[30] Foreign Application Priority Data

Apr. 25, 1997 [JP] Japan ..................... 9-109051

[51] Int. Cl.[7] .............. H04Q 7/00; H04Q 7/22; H04B 7/185
[52] U.S. Cl. .............. 455/31.3; 455/422; 455/425; 455/426; 370/316
[58] Field of Search .................. 455/425, 422, 455/31.3, 450, 31.2, 926; 370/316; 340/989

[56] References Cited

U.S. PATENT DOCUMENTS

| | | |
|---|---|---|
| 3,898,390 | 8/1975 | Wells et al. . |
| 4,144,496 | 3/1979 | Cunningham et al. . |
| 5,327,574 | 7/1994 | Monma et al. ............... 455/33.2 |
| 5,542,120 | 7/1996 | Smith et al. ............... 455/425 |
| 5,553,074 | 9/1996 | Acampora . |
| 5,691,980 | 11/1997 | Welles et al. ............... 370/316 |
| 5,771,449 | 6/1998 | Blasing et al. ............... 455/422 |
| 5,933,763 | 8/1999 | Wang et al. ............... 455/31.3 |
| 5,940,756 | 8/1999 | Sibecas et al. ............... 455/426 |

FOREIGN PATENT DOCUMENTS

| | | |
|---|---|---|
| 63-52526 | 3/1988 | Japan . |
| 3-247029 | 11/1991 | Japan . |
| 5-55980 | 3/1993 | Japan . |
| 8-84112 | 3/1996 | Japan . |

*Primary Examiner*—William Cumming
*Attorney, Agent, or Firm*—Foley & Lardner

[57] ABSTRACT

A mobile communications system includes a service-providing base station for providing down-link communication to the mobile station to transmit broadcast service data to a mobile station. In a switch device of the mobile communications system, it is determined whether the mobile station can communicate with the service-providing base station based on available base station information received from the mobile station. The available station information indicates an available base station with which the mobile station can communicate. The mobile station is instructed to change a receive channel to a down-link channel of the service-providing station when the mobile station can communicate with the second base station.

7 Claims, 7 Drawing Sheets

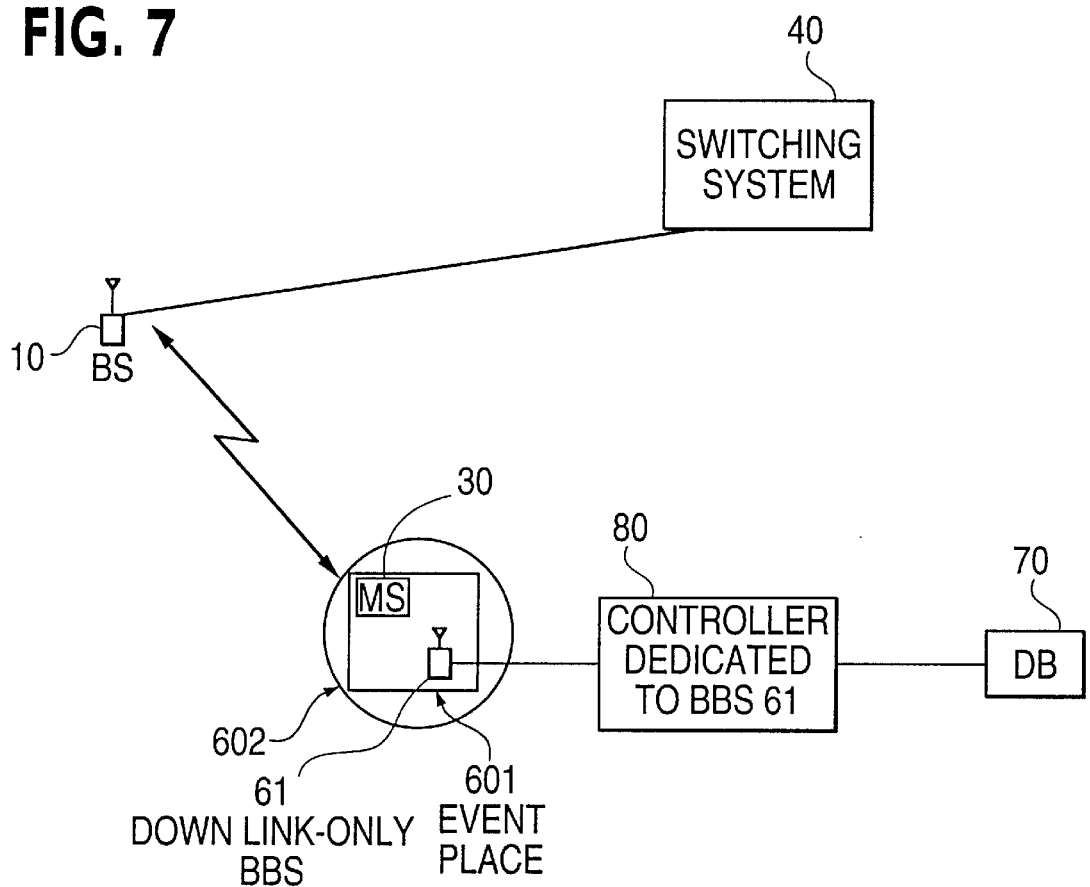

MOBILE COMMUNICATIONS SYSTEM

BACKGROUND OF THE INVENTION

1. Field of the Invention

The present invention relates to a mobile communications system and, particularly, to a broadcast system and method in the mobile communications system.

2. Description of the Prior Art

There have been proposed several broadcast systems using a mobile communications network including a plurality of base stations each forming a radio communication zone.

In a system disclosed in Japanese Patent Application Laid-Open No. 3-247029, a single radio communication zone is formed by a plurality of base stations, where a specific radio channel is assigned to a selected one of the base stations. When the selected base station receives a broadcast request signal from a mobile terminal, all or predetermined base stations are used to perform broadcasting.

In a broadcast system disclosed in Japanese Patent Application Laid-Open No. 63-52526, when receiving a broadcast request signal from a mobile terminal, a switching system transmits a broadcast mode switch request signal to the mobile terminal. When receiving the broadcast mode switch request signal, the mobile terminal changes a receive channel to the broadcast channel.

However, according to the above conventional system forming a single radio communication zone by using a plurality of base stations, it is necessary to assign the specific radio channel to the selected base station.

Further, according to the above conventional systems, it is impossible to provide broadcast services within only an area smaller than a radio communication zone or cell.

SUMMARY OF THE INVENTION

An object of the present invention is to provide a mobile communications system which can provide broadcast services to a desired area located a mobile station in response to a service request from the mobile terminal.

Another object of the present invention is to provide a broadcast system and method which can provide broadcast services within a specific and limited area.

According to the present invention, broadcast service data is provided to a mobile station depending on a service request from the mobile station in a mobile communications system where a base station provides two-way communication to the mobile station. A mobile communications system includes a service-providing base station for providing at least down-link communication from the service-providing base station to the mobile station to transmit the broadcast service data to the mobile station. Further, there are provided a determiner and a controller. The determiner determines whether the mobile station can communicate with the service-providing base station based on available base station information received from the mobile station. The available station information indicates an available base station with which the mobile station can communicate. The controller instructs the mobile station to change a receive channel to a down-link channel of the service-providing station when it is determined that the mobile station can communicate with the second base station.

Since the broadcast service data is provided to the mobile station through the service-providing base station depending on a service request from the mobile station in a mobile communications system, the broadcast service data can be provided to a specific service area formed by the service-providing base station in response to the service request from the mobile station.

Further, since the service-providing base station provides the specific service area, such a specific service area may be easily installed temporarily or permanently at a desired location.

BRIEF DESCRIPTION OF THE DRAWINGS

FIG. 7 is a diagram showing another example of a broadcast system according to the present invention.

DESCRIPTION OF THE PREFERRED EMBODIMENTS

COMMUNICATION SYSTEM

Figure 1:
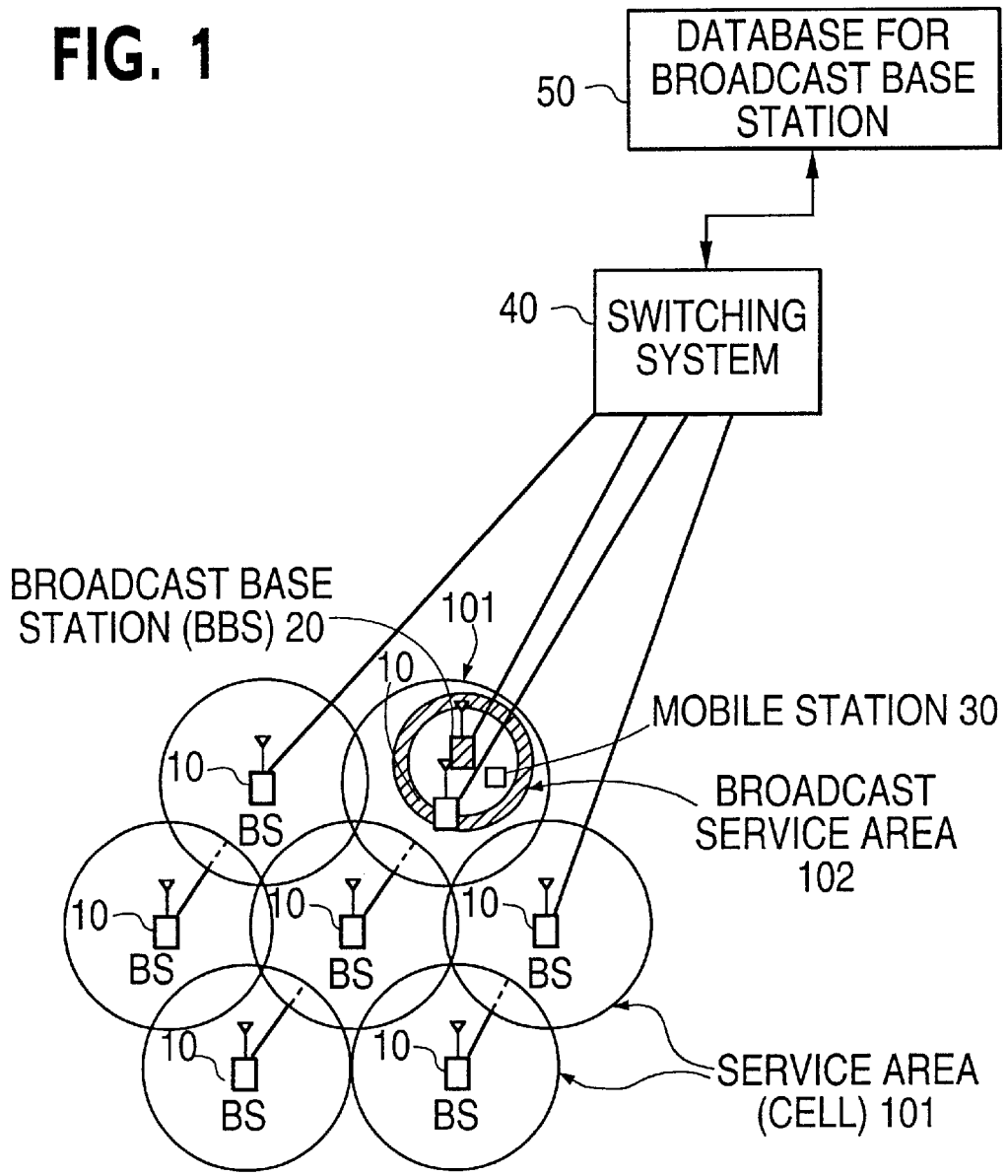
FIG. 1 is a schematic block diagram showing a system configuration of an embodiment of a mobile communications system according to the present invention.

Referring to FIG. 1, a mobile communication system is composed of a plurality of base stations (BS) 10 for forming service areas 101 that are arranged in cellular form, a broadcast base station (BBS) 20 for forming a broadcast service area 102, and a mobile station (MS) carried by each subscriber. The broadcast base station (BBS) 20 is temporarily or permanently installed at a desired location. The broadcast service area 102 may be narrower than the service area 101 of a base station (BS) 10. The mobile station 30 has a broadcast request function and a channel change function of changing a receive channel to a broadcast channel.

The base stations 10 and the broadcast base station 20 are connected to a switching system 40 which may be connected to a public network and set up a desired connection among them. The switching system 40 is further connected to a database 50 which stores broadcast data. As will be described later, when the mobile station 30 requests broadcast communication, the broadcast data, if possible, is transferred from the database 50 to the broadcast base station 20 under control of the switching system 40 and is then transmitted from the broadcast base station 20 to the mobile station 30 through a broadcast radio channel.

SWITCHING SYSTEM

Figure 2:
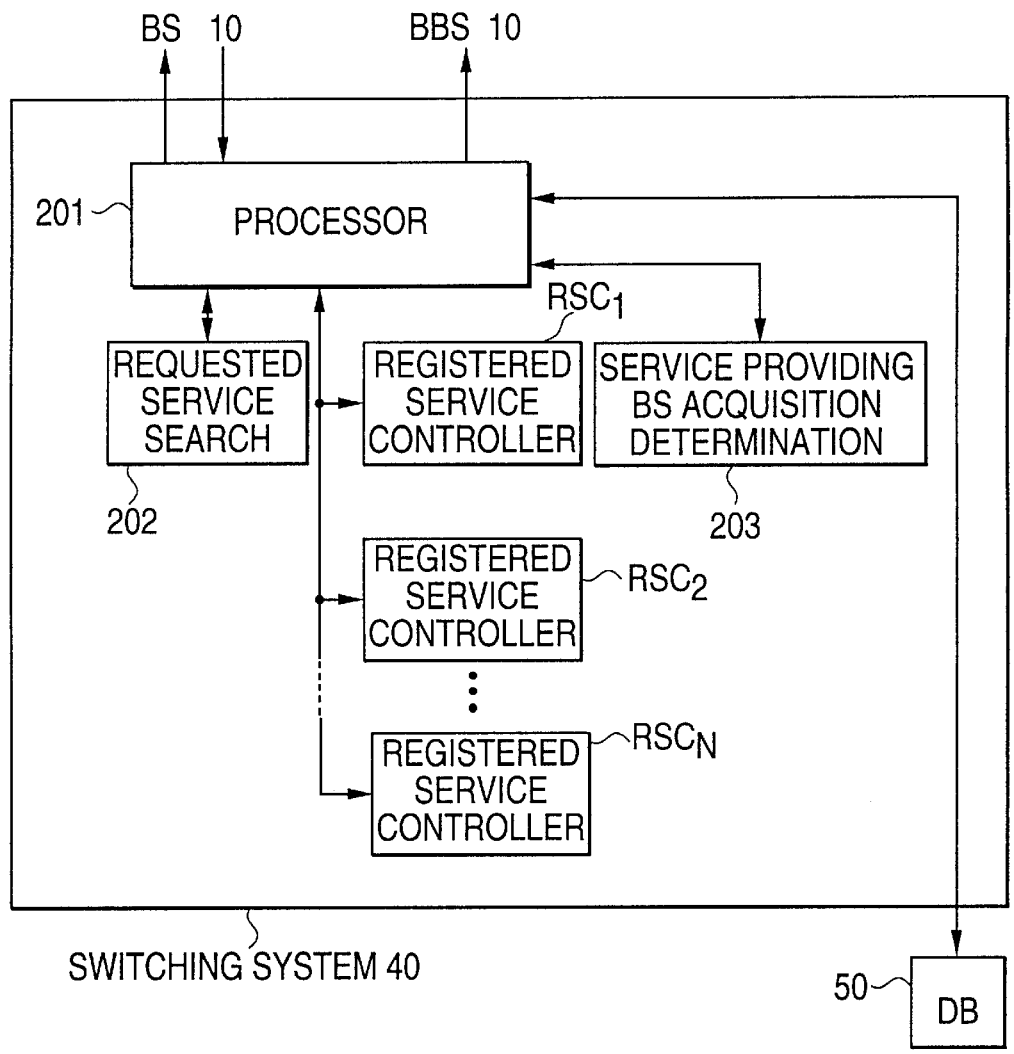
FIG. 2 is a block diagram showing a switching system of the embodiment.

Referring to FIG. 2, the switching system 40 is comprised of a processor 201 which performs switching operation control and broadcast control. The processor 201 is connected to a requested service search section 202 and a plurality of registered service controllers $RSC_1$-$RSC_N$. Each of the registered service controllers $RSC_1$-$RSC_N$ has a table containing registered service, service-providing station information and the service channel of the service-providing station. In this embodiment, one of the registered service controllers $RSC_1$-$RSC_N$ is designed to provide the broadcast service.

Under control of the processor 201, the requested service search section 202 searches the registered service controllers $RSC_1$-$RSC_N$ for the requested service. If such a service is found, the requested service can be provided and, if not, it cannot be provided.

Further, the processor 201 is connected to a determination section 203 which determines whether the service-providing station for the requested service can be acquired by the mobile station 30 based on the service-providing station information received from the processor 201 and the currently acquired station information received from the mobile station 30.

The processor 201 controls the database 50 to transfer broadcast data to the broadcast base station 20 when the request service is a broadcast service and can be provided. The details will be described later.

MOBILE STATION

Figure 3:
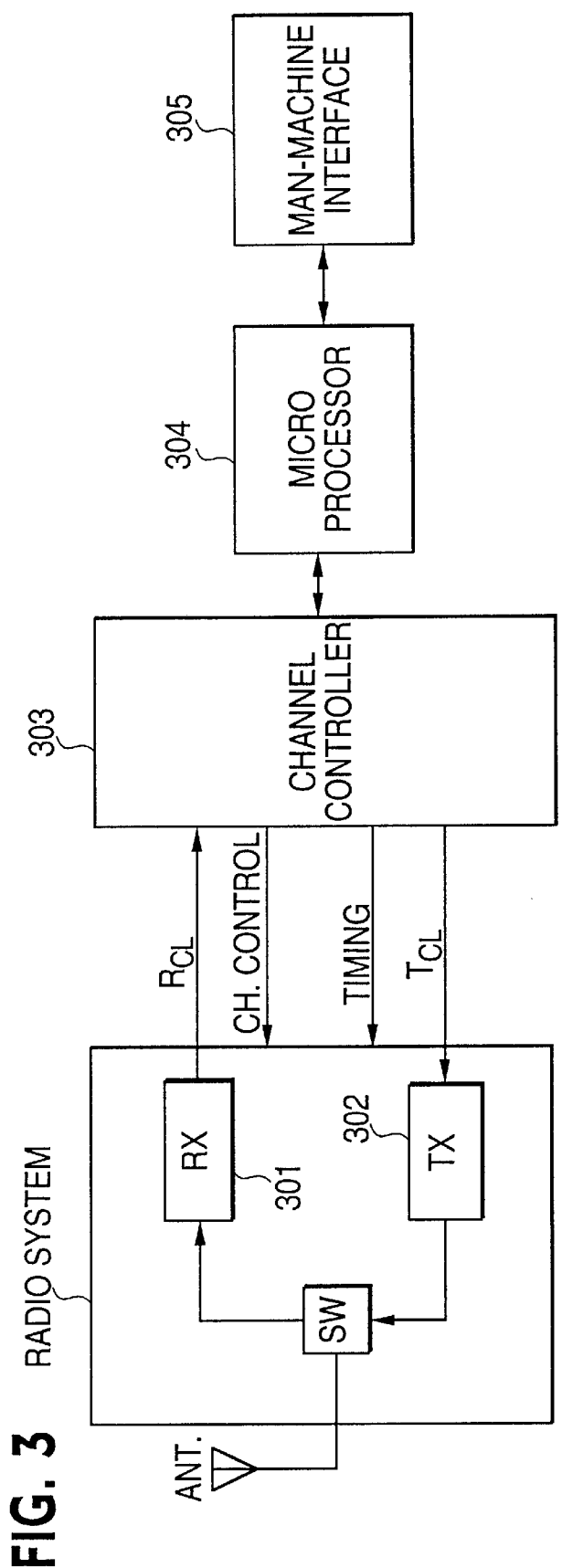
FIG. 3 is a block diagram showing an internal circuit configuration of a mobile station in the embodiment.

Referring to FIG. 3, an antenna for communication with a base station (BS) and/or a broadcast base station (BBS) is connected to a radio system comprising a receiver 301 and a transmitter 302 via an antenna switch. The receiver 301 demodulates a radio signal that is received from the base station and/or the broadcast base station and outputs a receive signal $R_{CL}$ to a channel controller 303. The transmitter 302 modulates and power-amplifies a transmit signal $T_{CL}$ input from the channel controller 303 and outputs a resulting radio-frequency transmitting signal to the antenna via the antenna switch. The channel controller 303 is controlled by a microprocessor 304 which performs the operation control of the mobile station 30. A man-machine interface such as a keypad and a display is connected to the microprocessor 304.

The channel controller 303 performs channel control and other necessary controls of the radio system. The receiver 301 intermittently receives a control signal from a base station (BS and/or BBS) through a control channel. Since the received control signal conveys the information of a source base station, it is determined which base station can be acquired. In the case where the mobile station 30 is located in both the service area 101 and the broadcast service area 102, the mobile station 30 receives both down-link control signals.

Therefore, for example, when receiving the control signal with more than a predetermined strength of electric field, the mobile station 30 transmits a response signal including the information of an acquired base station to the base station. Alternatively, in the case of a relatively small area such as a building, the mobile station 30 may transmit to the base station a response signal including the information of a base station corresponding to the maximum received strength of electric field.

When a user requests a broadcast service by operating the keypad, the microprocessor 304 controls the channel controller so that a service request signal is transmitted to the base station 10. At this time, an up-link control signal having the currently acquired base station information may be transmitted to the base station 10.

Further, the channel controller 303 can perform a channel change function of changing a receive channel to a broadcast channel. When receiving a channel change instruction signal from the switching system 40 through the base station BS, the channel controller 303 changes the receiving channel to the broadcast channel instructed end, when the broadcast channel has been acquired, the channel controller 303 changes the radio system to a receive-only mode for the broadcast channel.

OPERATION

Figure 4:
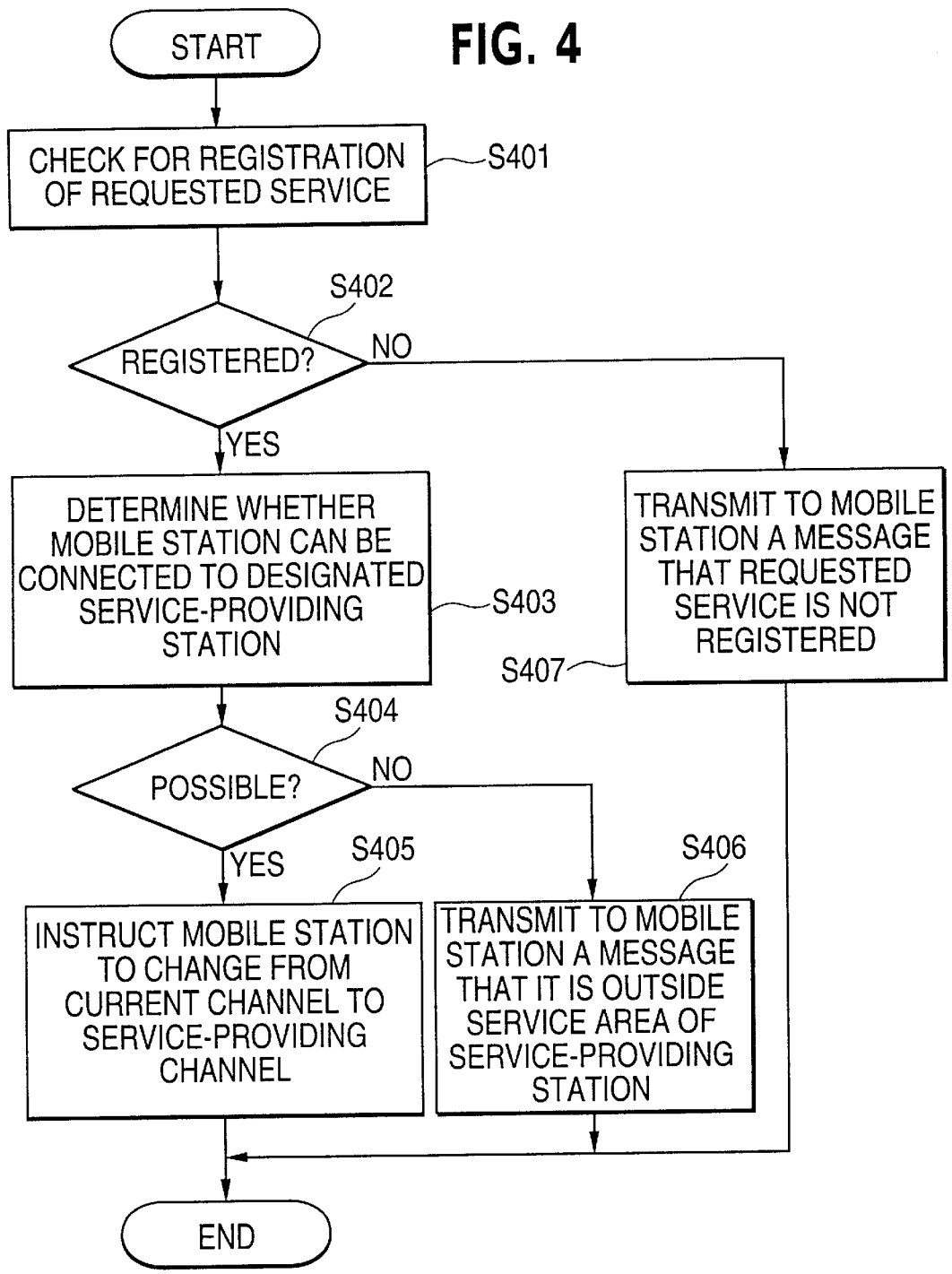
FIG. 4 is a flowchart showing a broadcast control operation of the switching system of FIG. 2.

Referring to FIG. 4, when receiving the service request signal from the mobile station 30, the processor 201 of the switching system 40 instructs the requested service search section 202 to check for registration of the requested service (step S401). As described before, the requested service search section 202 searches the registered service controllers $RSC_1$-$RSC_N$ for the requested service.

If such a service is registered (YES in step S402), the processor 201 transfers the service-providing station and its service-providing channel information from the corresponding registered service controller to the determination section 203.

Further, the processor 201 receives the currently acquired base station information of the mobile station 30 through the base station BS as described before. More specifically, the mobile station 30 transmits to the switching system 40 the up-link signal conveying the information of each base station from which the control signal is successfully received.

As shown in FIG. 1, for example, in the case where the mobile station 30 is located in the broadcast service area 102 included in the service area 101, the mobile station 30 may transmit to the switching system 40 the respective up-link signals conveying information of the base station BS 10 for the service area 101 and information of the broadcast base station BBS 20 for the broadcast service area 102.

Alternatively, in the case where the broadcast service area 102 is much smaller than the service area 101, such as an area inside a building, the mobile station 30 may transmit to the switching system 40 the up-like signal conveying information of a base station corresponding to the maximum received strength of electric field. Here, the information of the broadcast base station BBS 20 will be transmitted to the switching system 40.

When receiving the service-providing station and its service-providing channel information and the currently acquired base station information of the mobile station 30 from the processor 201, the determination section 203 determines whether the service-providing station for the requested service can be acquired by the mobile station 30 (step S403). More specifically, when the service-providing station information for the requested service is included in the currently acquired base station information of the mobile station 30, the determination section 203 determines that the service-providing station for the requested service can be acquired by the mobile station 30.

If it is determined that the service-providing station for the requested service can be acquired by the mobile station 30 (YES in step S404), the processor 201 transmits a channel change instruction signal to the mobile station 30 so that the mobile station 30 changes its receiving channel from the current channel to the service-providing channel (step S405). For example, if the requested service is the broadcast service, the mobile station 30 is instructed to change to the broadcast channel.

It is determined that the service-providing station for the requested service cannot be acquired by the mobile station 30 (NO in step S404), the processor 201 transmits to the mobile station 30 a message that the mobile station is outside the service area of the service-providing station (step S406). On the other hand, if the requested service fails to be found in the registered service controllers $RSC_1$-$RSC_N$ (NO in step S402), the processor 201 transmits to the mobile station 30 a message that the requested service is not registered (step S407).

Figure 5:
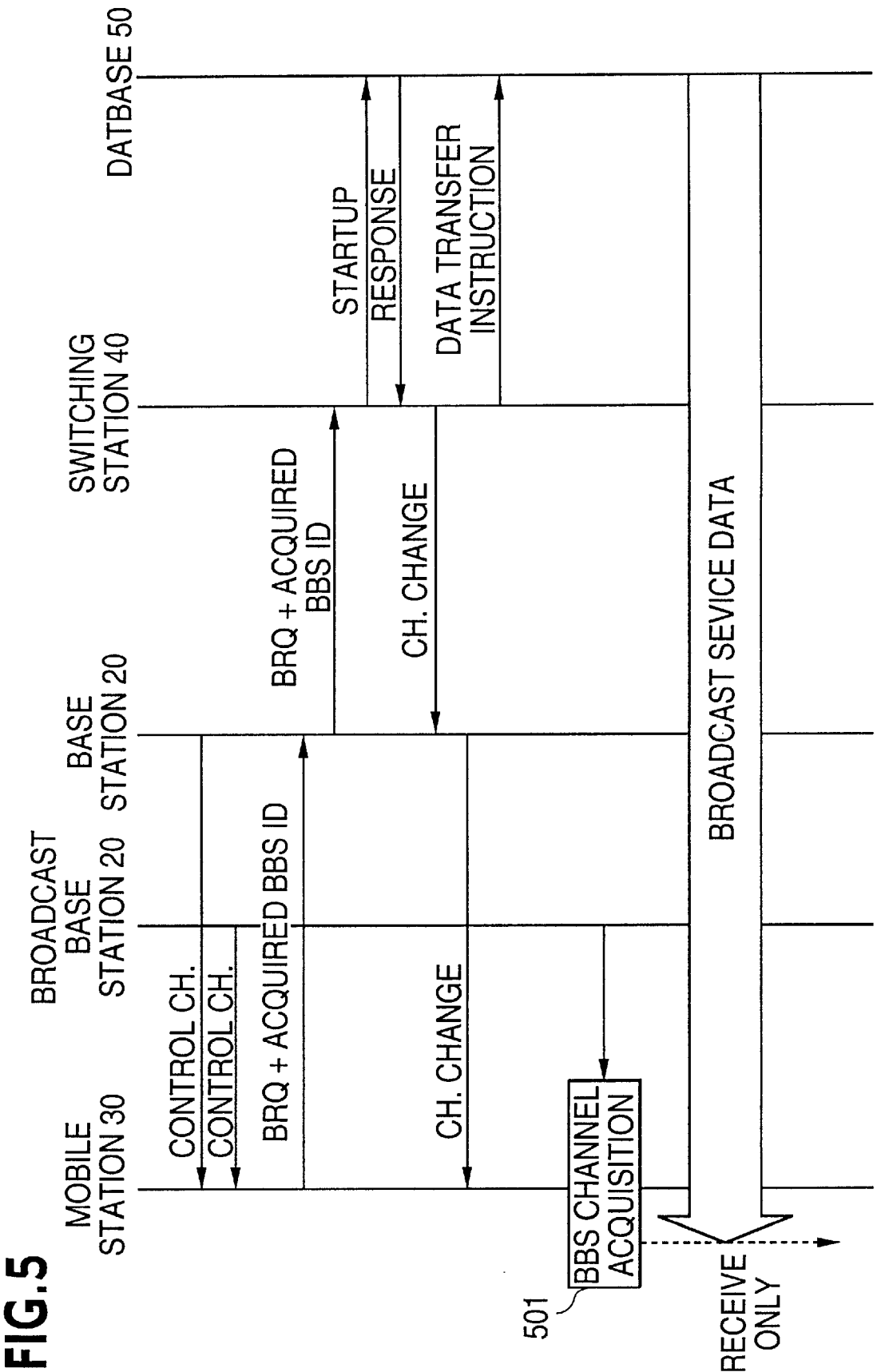
FIG. 5 is a sequence diagram showing an operation of the mobile communications system of FIG. 1.

Referring to FIG. 5, in the case where the mobile station 30 transmits to the switching system 40 the broadcast service request signal BRQ and the up-link signal conveying information of the broadcast base station BBS 20, the switching system 40 performs the requested service check and the acquisition check as described before.

If it is determined that the service-providing station for the requested service can be acquired by the mobile station 30, the processor 201 transmits the channel change instruction signal to the mobile station 30. This causes the mobile station 30 to change its receiving channel from the current channel to the down-link broadcast service channel.

When the down-link broadcast service channel is acquired (501), the mobile station 30 changes its mode to the receive-only mode and receives the broadcast service data from the database 50 through the broadcast base station 20.

It should be noted that the database 50 may be replaced with other equipment such as audio live broadcast equipment. Further, the switching system 40 and base stations 10 may conform to digital mobile telephone system standards (for example, RCR STD-27D) or second-generation cordless telephone system standards (RCR STD-28).

Figure 6:
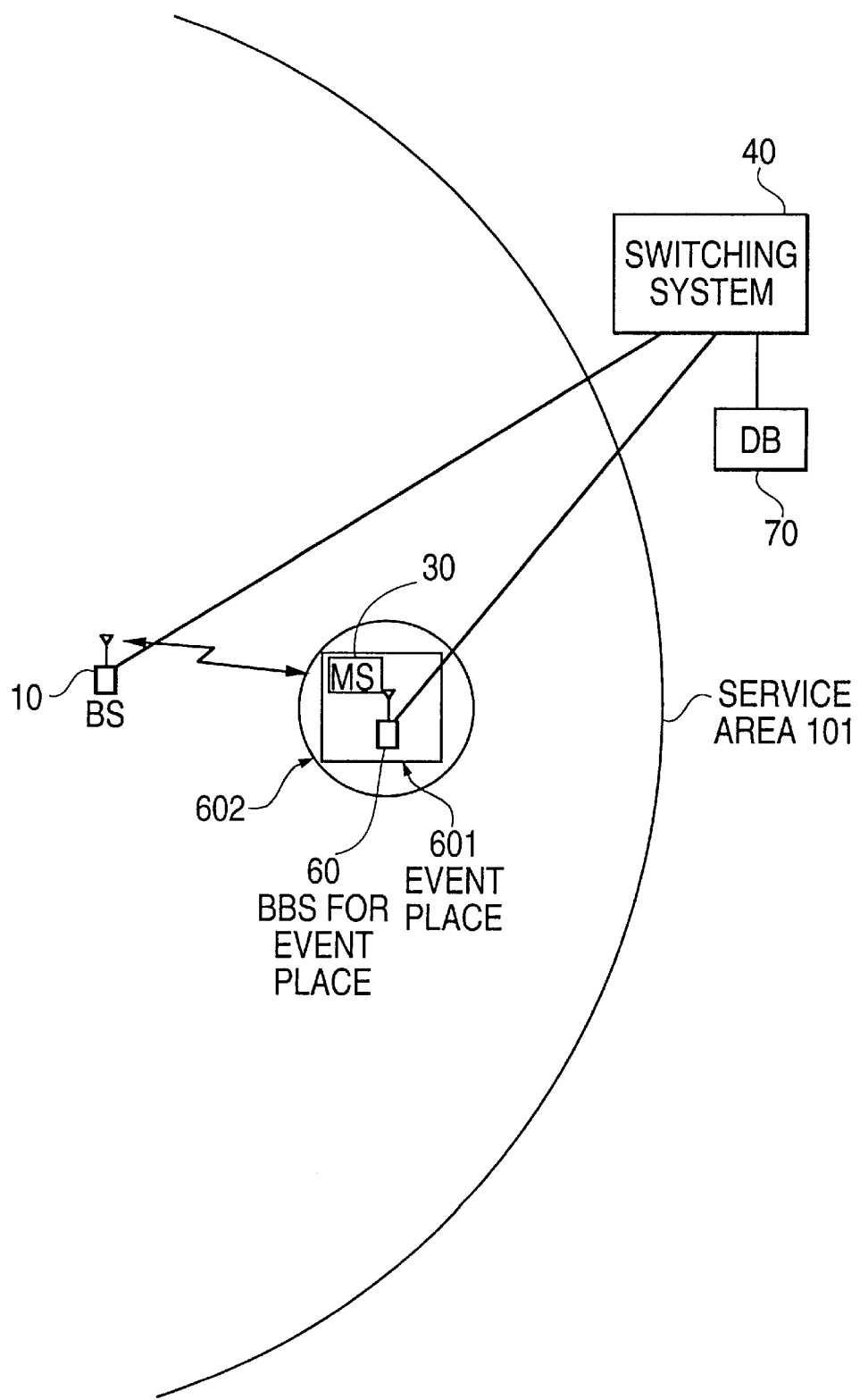
FIG. 6 is a diagram showing an example of a broadcast system according to the present invention.

As shown in FIG. 6, a broadcast base station (BBS) 60 is temporarily or permanently installed at an event place 601 such as a building within the service area 101 of a base station 10. For example, the broadcast base station (BBS) 60 may be installed when the event is opened and removed when it is ended.

The event place 601 is covered by a broadcast service area 602 formed by the broadcast base station (BBS) 60. Therefore, when the mobile station 30 is located outside the broadcast service area 602 but inside the service area 101, the mobile station 30 will not acquire the broadcast channel of the broadcast base station (BBS) 60 but will acquire the communication channel of the base station 10.

On the other hand, when the mobile station 30 is located inside the broadcast service area 602, the mobile station 30 can acquire both the down-link broadcast channel of the broadcast base station (BBS) 60 and the down-link communication channel of the base station (BS) 10. In the case where the broadcast service area 602 is much smaller and the strength of electric field therein is much stronger than the service area 101, the mobile station 30 will transmit the information of broadcast base station 60 to the switching system 40.

The switching system 40 is connected to a database 70 which stores broadcast data such as event audio guide data or audio live broadcast data. As described before, when the mobile station 30 requests a broadcast service through the up-link communication channel of the base station 10, the requested service search section 202 of the switching system 40 determines whether the broadcast service has been registered and, if it has been registered, the service-providing station information is transferred from the corresponding registered service controller to the determination section 203.

Since the information of at least broadcast base station 60 which can be acquired by the mobile station 30 has been received from the mobile station 30, the determination section 203 determines that the mobile station 30 can be connected to the service-providing station, that is, the broadcast base station 60. Subsequently, the processor 201 of the switching system 40 transmits the channel change instruction to the mobile station 30 through the down-link communication channel of the base station 10 so that the receiving channel of the mobile station 30 is changed to the down-link broadcast channel.

When the channel has been changed to the down-link broadcast channel, the mobile station 30 starts receiving the broadcast event audio guide service from the database 70 via the broadcast base station 60. Thereafter, the mobile station 30 is set to the receive-only mode.

ANOTHER SYSTEM CONFIGURATION

As described before, the mobile station 30 does not perform up-link communication after the broadcast event audio guide service is started. Therefore, it is not necessary to transfer the broadcast service data to the mobile station 30 via the switching system 40.

As shown in FIG. 7, although the radio service areas 101, 601 and 602 are arranged as shown in FIG. 6, the database 70 is not connected to the switching system 40 but instead is connected to a downlink-only broadcast base station (downlink-only BBS) 61 through a controller 80. The controller 80 is used to connect the database 70 to the broadcast base station (BBS) 61. The downlink-only broadcast base station 61 has the same function as the broadcast base station 60 of FIG. 6.

The operation of such a system configuration is basically the same as in the case shown in FIG. 6 but the broadcast service data is directly transferred to the downlink-only broadcast base station 61 through the controller 80.

Since it is not necessary to connect the broadcast base station 61 to the switching system 40, the same broadcast service can be provided to the mobile station 30 with dramatically improved cost efficiency and convenience.

What is claimed is:

1. A system for providing broadcast service data to a mobile station depending on a service request from the mobile station in a mobile communications system where a base station provides two-way communication to the mobile station, comprising:

a service-providing base station for providing at least down-link communication from the service-providing base station to the mobile station to transmit the broadcast service data to the mobile station;

a determiner for determining whether the mobile station can communicate with the service-providing base station based on available base station information received from the mobile station, the available station information indicating an available base station with which the mobile station can communicate; and a controller for instructing the mobile station to change a receive channel to a down-link channel of the service-providing base station when it is determined that the mobile station can communicate with the service-providing base station, wherein the controller controls the service-providing base station such that service data is transferred to the mobile station via the service-providing base station through the down-link channel.

2. A system for providing broadcast service data to a mobile station depending on a service request from the mobile station in a mobile communications system where a base station provides two-way communication to the mobile station, comprising:

a service-providing base station for providing at least down-link communication from the service-providing base station to the mobile station to transmit the broadcast service data to the mobile station;

a determiner for determining whether the mobile station can communicate with the service-providing base station based on available base station information received from the mobile station, the available station information indicating an available base station with which the mobile station can communicate; and a controller for instructing the mobile station to change a receive channel to a down-link channel of the service-providing base station when it is determined that the mobile station can communicate with the service-providing base station, wherein the mobile station changes to a receive-only mode when receiving service data from the service-providing base station.

3. A mobile communications system comprising:

a plurality of base stations each forming a service area which provides a mobile station with two-way communication;

at least one service-providing base station for providing down-link communication for broadcast service from the service-providing base station to the mobile station; and a switch device connected to the base stations, the switch device comprising:
   a determiner for determining whether the mobile station can communicate with the service-providing base station based on available base station information received from the mobile station when a broadcast service request is received from the mobile station, the available station information indicating an available base station with which the mobile station can communicate;
   a controller for instructing the mobile station to change a receive channel to a down-link broadcast service channel of the service-providing base station when it is determined that the mobile station can communicate with the service-providing base station;
   a service controller for storing service-providing information corresponding to a plurality of services; and
   a searcher for searching the service controller for service-providing station information corresponding to the broadcast service request,
   wherein the determiner determines whether the mobile station can communicate with the service-providing base station based on the service-providing station information corresponding to the broadcast service request and the available base station information received from the mobile station, the available station information indicating the available base station with which the mobile station can communicate.

4. A mobile communications system comprising:

a plurality of base stations each forming a service area which provides a mobile station with two-way communication;

at least one service-providing base station for providing down-link communication for broadcast service from the service-providing base station to the mobile station; and a switch device connected to the base stations, the switch device comprising:
   a determiner for determining whether the mobile station can communicate with the service-providing base station based on available base station information received from the mobile station when a broadcast service request is received from the mobile station, the available station information indicating an available base station with which the mobile station can communicate; and
   a controller for instructing the mobile station to change a receive channel to a down-link broadcast service channel of the service-providing base station when it is determined that the mobile station can communicate with the service-providing base station,
wherein the switch device is connected to the service-providing base station to control the down-link broadcast service channel of the service-providing base station.

5. A mobile communications system comprising:

a plurality of base stations each forming a service area which provides a mobile station with two-way communication;

at least one service-providing base station for providing down-link communication for broadcast service from the service-providing base station to the mobile station; and a switch device connected to the base stations, the switch device comprising:
   a determiner for determining whether the mobile station can communicate with the service-providing base station based on available base station information received from the mobile station when a broadcast service request is received from the mobile station, the available station information indicating an available base station with which the mobile station can communicate; and
   a controller for instructing the mobile station to change a receive channel to a down-link broadcast service channel of the service-providing base station when it is determined that the mobile station can communicate with the service-providing base station,
wherein the mobile station changes to a receive-only mode when receiving the broadcast service data from the service-providing base station.

6. A method for providing broadcast service data to a mobile station depending on a service request from the mobile station in a mobile communications system where a base station provides two-way communication to the mobile station via a switch device, comprising the steps of:

at the mobile station,
   transmitting a broadcast service request and available station information indicating an available base station with which the mobile station can communicate to the base station;

at the switch device,
   storing information of a service-providing base station for providing at least down-link communication from the service-providing base station to the mobile station to transmit broadcast service data to the mobile station;
   determining whether the mobile station can communicate with the service-providing base station based on available base station information received from the mobile station, the available station information indicating an available base station with which the mobile station can communicate; and
   instructing the mobile station to change a receive channel to a down-link channel of the service-providing base station when it is determined that the mobile station can communicate with the service-providing base station,
   wherein the switch device controls the service-providing base station such that service data is transferred to the mobile station via the service-providing base station through the down-link channel.

7. A method for providing broadcast service data to a mobile station depending on a service request from the mobile station in a mobile communication system where a base station provides two-way communication to the mobile station via a switch device, comprising the steps of:

at the mobile station,
transmitting a broadcast service request and available station information indicating an available base station with which the mobile station can communicate to the base station;

at the switch device,
storing information of a service-providing base station for providing at least down-link communication from the service-providing base station to the mobile station to transmit broadcast service data to the mobile station;

determining whether the mobile station can communicate with the service-providing base station based on available base station information received from the mobile station, the available station information indicating an available base station with which the mobile station can communicate; and instructing the mobile station to change a receive channel to a down-link channel of the service-providing base station when it is determined that the mobile station can communicate with the service-providing base station, wherein the mobile station changes to a receive-only mode when receiving service data from the service providing base station.

* * * * *